United States Patent
Gjaltema et al.

(10) Patent No.: US 9,959,277 B2
(45) Date of Patent: May 1, 2018

(54) SYSTEMS AND METHODS FOR MANAGING FILES IN A COMPUTER SYSTEM BY SEGMENTING FILES

(71) Applicant: ECHOSTAR GLOBAL B.V., Almelo (NL)

(72) Inventors: Hendrik Gjaltema, Almelo (NL); Herman Thijs, Almelo (NL); Jurgen Ten Buuren, Ootmarsum (NL)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 168 days.

(21) Appl. No.: 13/728,204

(22) Filed: Dec. 27, 2012

(65) Prior Publication Data

US 2014/0188826 A1   Jul. 3, 2014

(51) Int. Cl.
| | |
|---|---|
| *G06F 7/00* | (2006.01) |
| *G06F 17/30* | (2006.01) |
| *G06F 3/06* | (2006.01) |
| *H04N 21/426* | (2011.01) |
| *H04N 21/433* | (2011.01) |

(52) U.S. Cl.
CPC ...... *G06F 17/30079* (2013.01); *G06F 3/0611* (2013.01); *G06F 3/0643* (2013.01); *G06F 3/0674* (2013.01); *G06F 17/30091* (2013.01); *G06F 17/30138* (2013.01); *G06F 17/30233* (2013.01); *H04N 21/42661* (2013.01); *H04N 21/4332* (2013.01)

(58) Field of Classification Search
CPC .................................................. G06F 17/30233
USPC .......................................................... 707/822
See application file for complete search history.

(56) References Cited

U.S. PATENT DOCUMENTS

| | | | |
|---|---|---|---|
| 7,689,633 B1 * | 3/2010 | Li ..................... G06F 17/30067 707/821 |
| 2011/0238716 A1 * | 9/2011 | Amir et al. ................... 707/823 |
| 2012/0331252 A1 * | 12/2012 | Hahn et al. .................... 711/162 |

FOREIGN PATENT DOCUMENTS

| | | |
|---|---|---|
| CN | 102332027 A | 1/2012 |
| EP | 2527999 A1 | 11/2012 |
| WO | 2004097624 A1 | 11/2004 |

OTHER PUBLICATIONS

European Patent Office, Extended European Search Report for Application No. 13197993.2-1879 dated Mar. 23, 2017.

* cited by examiner

*Primary Examiner* — Ajith Jacob
(74) *Attorney, Agent, or Firm* — Lorenz & Kopf LLP

(57) ABSTRACT

Systems and methods allow for reliably and efficiently managing files stored on a data storage medium associated with a computer system such as a set-top box. In one embodiment a method of managing a file is provided. The method includes: mounting a first file system to a second file system; creating, by the first file system, a virtual file by partitioning a file into a plurality of segments and by linking the plurality of segments in an index file; and sending a file operation request, by the first file system, to the second file system based on the segments of the virtual file.

25 Claims, 10 Drawing Sheets

SYSTEMS AND METHODS FOR MANAGING FILES IN A COMPUTER SYSTEM BY SEGMENTING FILES

TECHNICAL FIELD

The present disclosure generally relates to computer file systems, and more particularly to systems and methods for managing files stored in a computer system using file segmenting methods and systems. The file management systems and methods may be used, for example, in a computer system used to implement a set-top box for processing received television or other audio/video signals.

BACKGROUND

Most television viewers now receive their television signals through a content aggregator such as a cable or satellite television provider. In the typical instance, encoded television signals are sent via a cable or wireless data link to the viewer's home, where the signals are ultimately decoded in a set-top box (STB) or other computing system. The decoded signals can then be viewed on a television or other appropriate display as desired by the viewer.

More recently, STBs and other computing systems have become more advanced, and now provide more features than were previously available. Many STBs, for example, now provide personal video recorder (PVR) functionality whereby programs contained within received signals are stored on a disk drive or other storage medium for later viewing. With the advent of PVR and other advanced features, many computing devices used in video processing now include hard disk or other data storage devices to increase the capability to store video and other content for subsequent enjoyment.

While the addition of mass storage to STBs and other computing systems can greatly improve the convenience and functionality for the customer, this new capability often comes with new engineering and operations issues. Access times for disk reads and writes, for example, can be relatively slow in comparison to reads and writes to memory, which in turn can affect the responsiveness or other performance of the system. While various file management systems have been attempted with varying levels of success, there nevertheless remains a desire to increase efficiency and robustness of file management.

It is therefore desirable to create systems and methods for managing files in a set-top box or other computing system. These and other desirable features and characteristics will become apparent from the subsequent detailed description and the appended claims, taken in conjunction with the accompanying drawings and this background section.

BRIEF SUMMARY

In various embodiments, systems and methods allow for reliable and efficient management of files stored on a data storage medium associated with a computer system such as a set-top box. In one embodiment a method of managing a file is provided. The method includes: mounting a first file system to a second file system; creating, by the first file system, a virtual file by partitioning a file into a plurality of segments and by linking the plurality of segments in an index file; and sending a file operation request, by the first file system, to the second file system based on the segments of the virtual file.

In other embodiments, a file management system of a computer system is provided. The file management system includes a data storage device, a first file system, and a second file system. The first file system interfaces with the data storage device. The second file system interfaces with the first file system to perform file operations on the data storage device for a file. The second file system performs the file operations based on an index file that includes information about a plurality of segments of the file.

In yet another embodiment, a set-top box is provided. The set-top box includes a data storage device, a first file system, and a second file system. The first file system interfaces with the data storage device. The second file system mounts to the first file system to perform file operations on the data storage device for a file. The second file system performs the file operations based on an index file that includes information about a plurality of segments of the file.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram illustrating an exemplary computing system capable of generating imagery on a display that includes a file management system in accordance with various embodiments;

DETAILED DESCRIPTION

Figure 1:
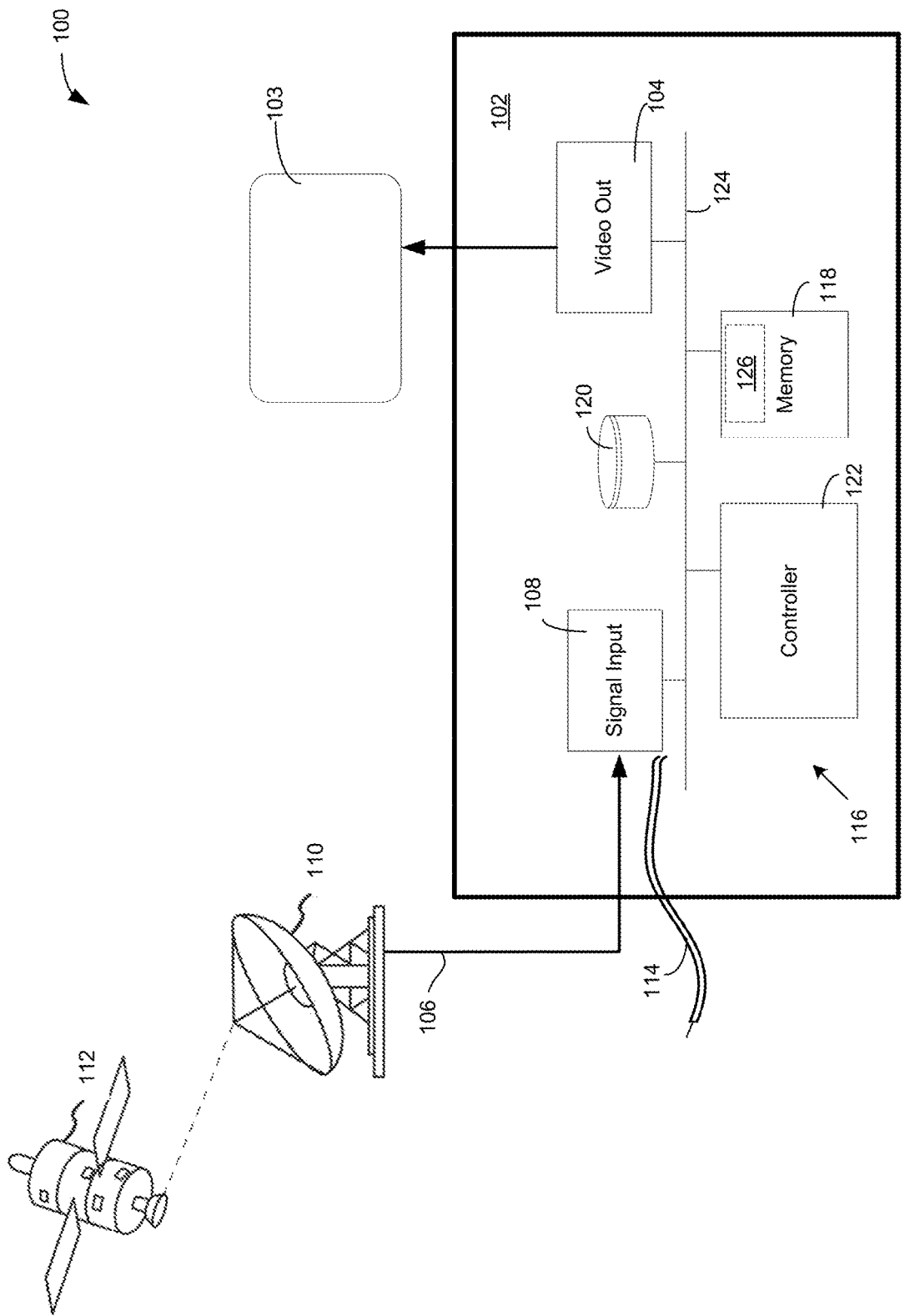

The following detailed description is merely exemplary in nature and is not intended to limit the disclosure or the application and its uses. Furthermore, there is no intention to be bound by any theory presented in the preceding background or the following According to various exemplary embodiments, file management systems are provided that include at least two file systems, one file system mounted to another. At least one of the two files systems manages a file as a virtual file that is partitioned into one or more segments using an information file (referred to as an index file) that links the segments. By managing the file as a virtual file, the file system is able to provide an improved efficiency of a current set of file operations of the file management system and to provide a more extended set of operations that may be used for PVR or other purposes.

For convenience, the concepts presented herein are frequently described with reference to a set-top box or similar system that is capable of generating television or other video imagery on a display 103. The disclosure is not so limited, however, and indeed the systems and methods described herein may be readily adapted and deployed in any other type of computing systems. Examples of other computing systems that could incorporate the concepts described herein include audio or video media players, personal digital assistants, personal video recorders, video game players, satellite or terrestrial radio receivers, audio/video systems and components (e.g. compact disc or digital video disc players; audio or video components associated with automobiles, aircraft or other vehicles; stereo receivers and/or amplifiers; jukeboxes and/or the like), portable telephones and/or any other devices or systems. Indeed, any device or system that incorporates a storage device (such as a disk drive) and that has a manageable set of files could benefit from the concepts described herein. Such other embodiments may therefore exhibit different and/or additional components to those shown in the drawing figures.

Turning now to the drawing figures, wherein like numeral indicate like or similar features. FIG. 1 shows an exemplary system 100 that includes a file management system in accordance with various embodiments. In various embodiments, the exemplary system 100 is used to present received television imagery on a display. For example, the system 100 includes a computing system 102. The computing system 102 is shown as a set-top box (STB) or other device capable of receiving television or similar content from a cable or satellite television provider and of generating a suitable output signal 104 in response to user inputs. In such embodiments, the computing system 102 is configured with one or more conventional interfaces 106 to receive signals 108 received from a wireless antenna 110, which in turn may receive wireless programming and other content from a satellite 112 and/or from any terrestrial-based transmitter. Alternatively or additionally, the computing system 102 may include any number of interfaces 106 to cable television signals and/or any other wired inputs 114. Other sources of television inputs that may be present in other embodiments include high or low definition broadcast sources, wireless or wired transmissions using any sort of broadcast, point-to-point or other transmit schemes, closed circuit television signals in any format, and/or other sources as appropriate. Many types of wired and wireless interfaces 106 for various types of computing devices 102 are widely known, and any presently-known or subsequently developed interfaces may be used in various equivalent embodiments.

In various embodiments, the computing system 102 includes any sort of processing or control circuitry 116 as well as associated memory 118 and a data storage medium 120 communicating with one or more processors 122 via a bus or other data connection 124. Various embodiments of the processor 122 include any sort of microcontroller or microprocessor executing any form of software code. The memory 118 may include any sort of digital memory (including any sort of read only memory, random access memory, flash memory and/or the like). The data storage medium 120, which is any sort of mass storage device, includes any sort of disk drive or other magnetic, optical or other storage capable of storing data, instructions and/or the like. A file management system 126 manages files stored to the data storage device 120, as will be discussed more fully with regard to FIG. 2. In various embodiments, the file management system 126 is stored in the memory 118 and includes software or firmware instructions that are executed by the processor 122 as appropriate.

In operation, the computing system 102 is able to receive television programming or other input data via any wired or wireless connection (e.g. interfaces 106 in FIG. 1). Imagery presented on display 103 may be directed using any number of control signals 106, which are provided from interface 106 in any digital or analog format (e.g., any format compatible with display 103). This operation generally takes place under the control of any appropriate hardware, software and/or firmware within computing system 102. In a set-top box with PVR functionality, for example, the processor 122 is able to receive a program file contained within input signals and to store the received program file as a data file on the data storage medium 120. The stored file may be later retrieved (e.g., in response to user inputs) for presentation on the display 103 as desired. The file management system 126 enables the processor 122 to store and retrieve the program file as a segmented file.

Figure 2:
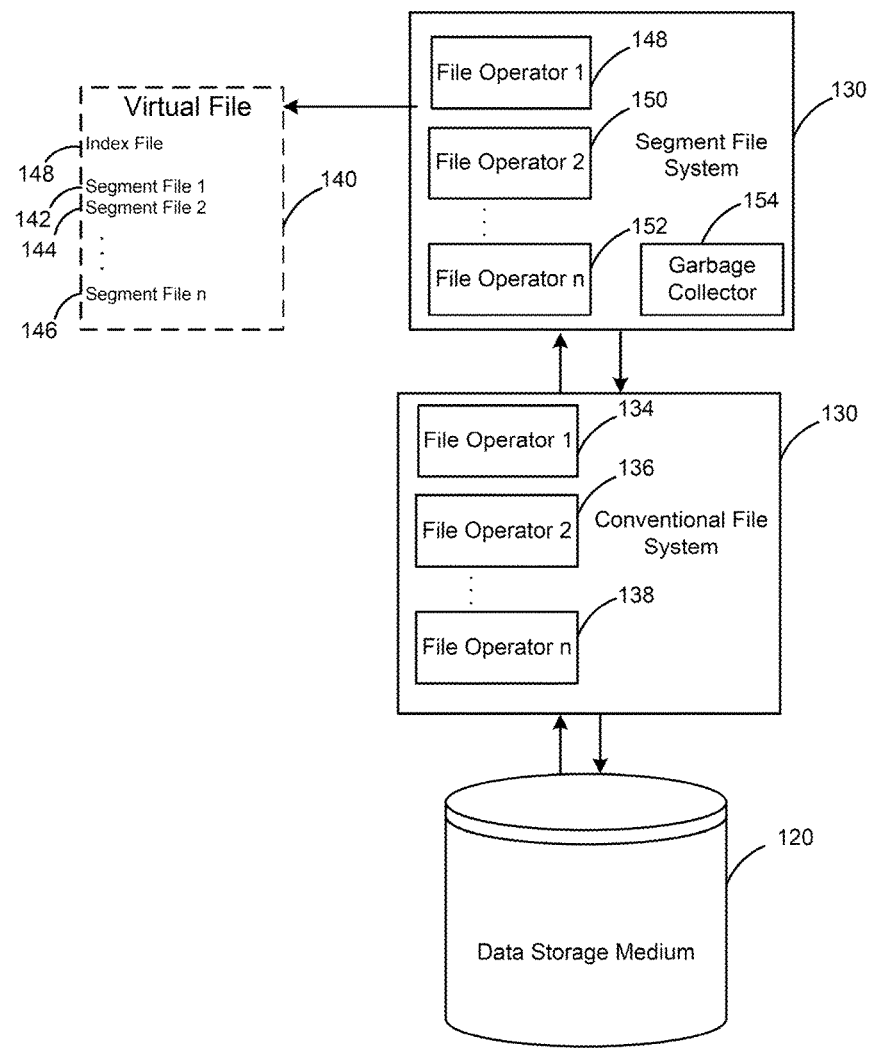
FIG. 2 is a block diagram illustrating various logical components of a file management system in accordance with exemplary embodiments.

Referring now to FIG. 2, a block diagram illustrates the file management system 126 in accordance with various embodiments. The file management system 126 includes a conventional file system 130 and a segment file system 132. The conventional file system 130 interfaces directly with the data storage medium 120 and can be any file system including but not limited to that can perform basic file operations (e.g., ext2, ext3 or ntfs). The conventional file system 130 includes programs, routines or other interfaces (referred to generally as operators 134-138) for performing various file operations, such as, but not limited to, opening, closing, reading, writing, finding and/or deleting files, as well as other features as appropriate. Various directory-related operations may also be performed, such as, but not limited to, making (e.g., "mkdir") and removing directories (e.g., "rmdir"), listing the contents of a directory, changing directories and/or the like.

The segment file system 132 interface with the conventional file system 130, for example, by being mounted to the conventional file system 130 (e.g., using one or more mount or unmount operations). The segment file system 132 manages a file (e.g., a program file) as a virtual file 140 that is partitioned into one or more segments 142-146 using an index file 148 that tracks a location and order of the various segments 142-146. As can be appreciated, the size and/or number of segments 142-146 can be configured at mountime of the segment file system 132 (i.e., they are configurable). By utilizing the virtual file 140, the segment file system 132 can include additional programs, routines, or other interfaces (referred to generally as operators 148-152 for performing operations such as, but not limited to, truncate and trimleft, in addition to the basic operations including, but not limited to, opening, closing, reading, writing, finding, deleting files, and making, removing and/or changing directories. As will be discussed with regard to FIGS. 3-10, some of the basic operations are modified to operate on the virtual file 140. The interfaces of the conventional file system 130 do not change when mounting the segment file system 132, thus the operations can be performed as usual without disruption to the user.

The segment file system 132 can further include a garbage collector 154. As will be discussed in more detail with regard to FIG. 11, the garbage collector 154 periodically causes unused data to be removed from the data storage device.

Figure 3:
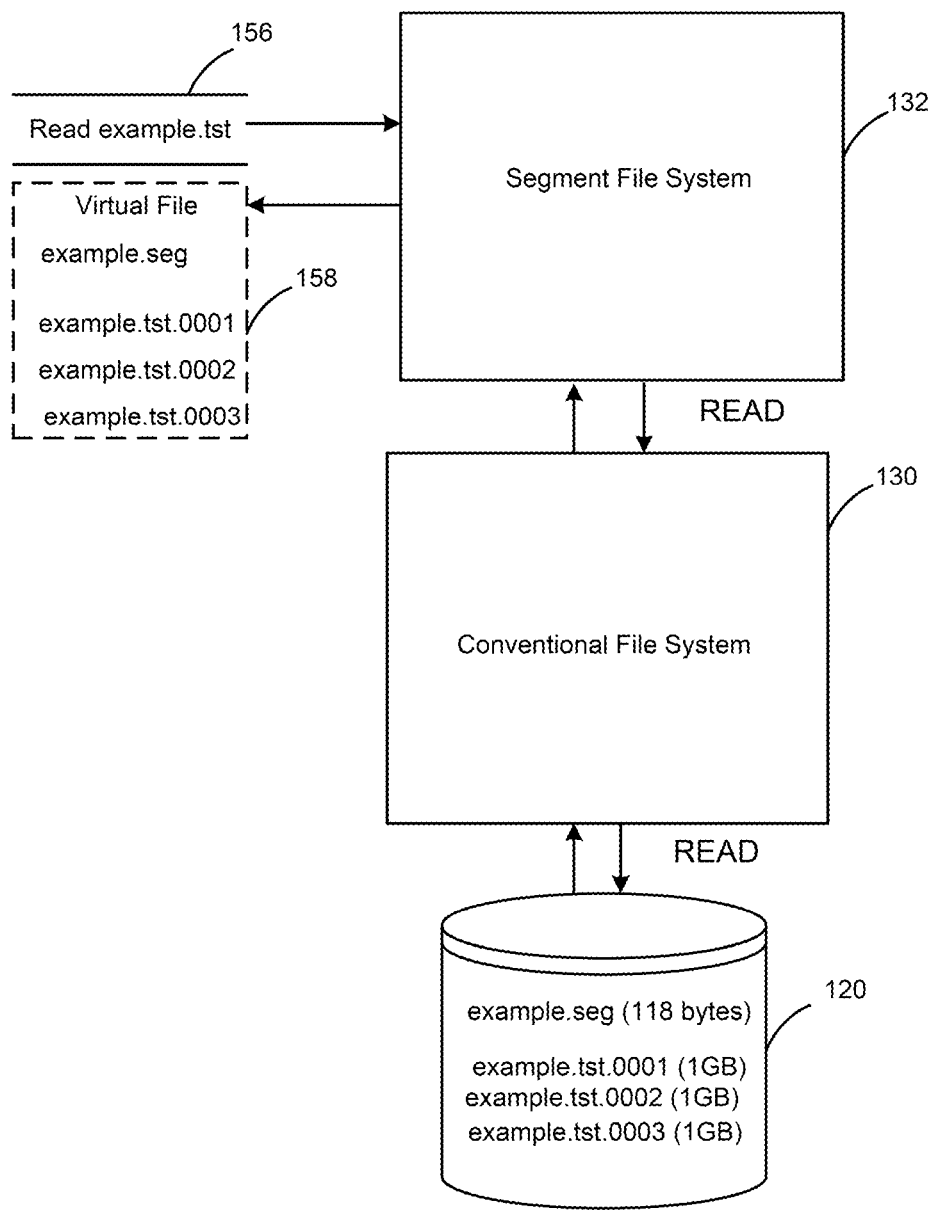
FIGS. 3-9 are flow diagrams illustrating exemplary operations of the file management system in accordance with exemplary embodiments.

Referring now to FIGS. 3-9, where some of the operations of operators 148-152 of the segment file system 132 are shown and described. FIG. 3. Illustrates a read operation performed on an exemplary program file. For example, a read request 156 is received through a file system interface for a file (example.tst). The file, in this example, has a size of 3 gigabytes. The segment file system 132 has partitioned the file into three segments of 1 gigabyte each (example.tst.0001-example.tst.0003) and stores the location and segment information in the index file (example.seg). The segment file system 132 receives the read request 156 and builds a virtual file 158 based on the segment information in the index file (example.seg). To build the virtual file 158, the segment file system 132 sends read requests to the conventional file system 130 for each segment (example.tst.0001-example.tst.0003). The conventional file system 130 then in turn reads the data storage medium 120 and provides the data of each segment (example.tst.0001-example.tst.0003) to the segment file system 132.

Figure 4:
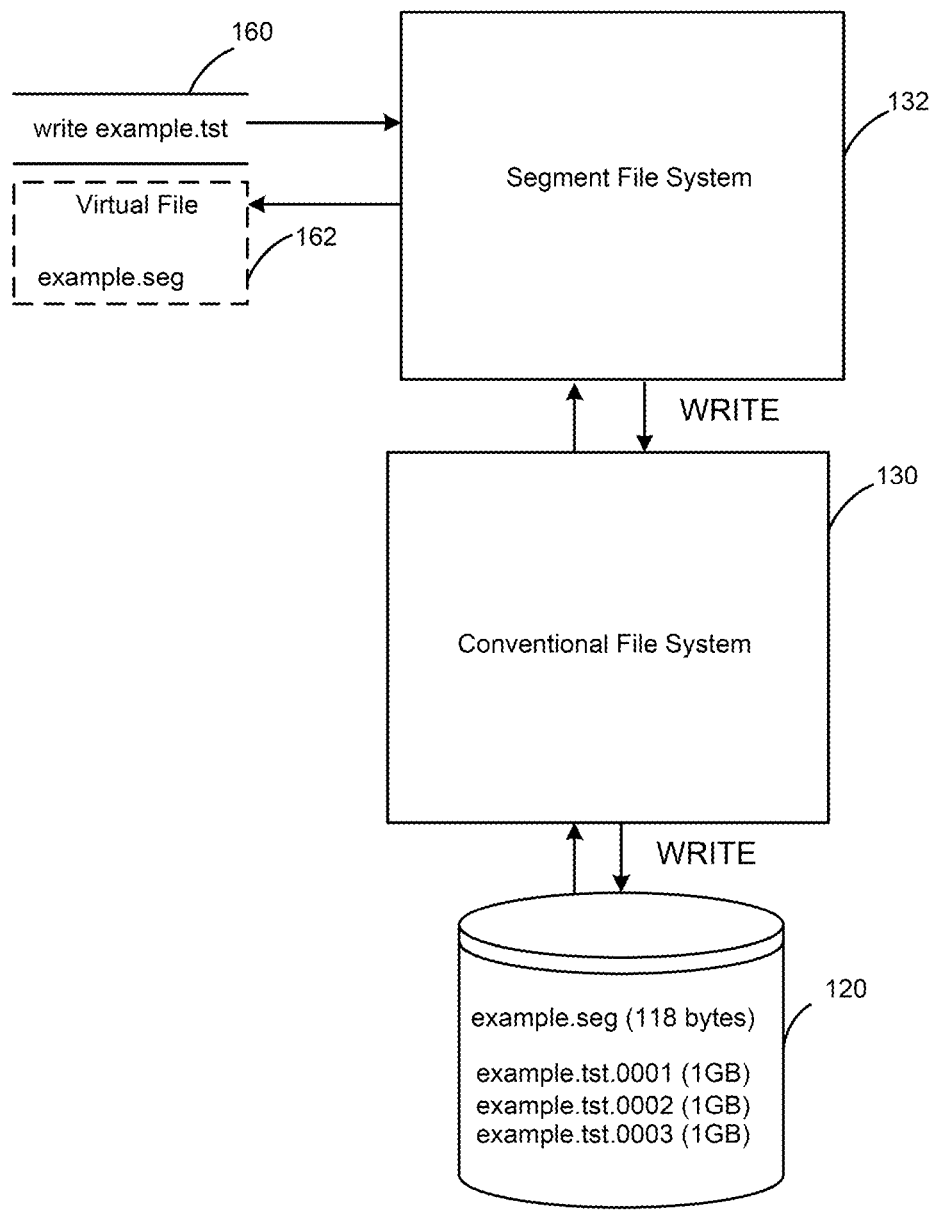

FIG. 4 illustrates a write operation performed using the same exemplary program file of FIG. 3. For example, a write request 160 of the program file (example.tst) is requested through the file system interface. The segment file system 132 partitions the program file (example.tst) into the segments (example.tst.0001-example.tst.0003) and issues write requests to the conventional file system 130 for each segment (example.tst.0001-example.tst.0003). The conventional file system 130 receives the write requests and writes the segments (example.tst.0001-example.tst.0003) as separate files into the data storage medium 120. The segments (example.tst.0001-example.tst.0003) can be stored in the same or different directories. The index file (example.seg) of a virtual file 162 is created and updated with the stored location and order of the segments.

Figure 5:
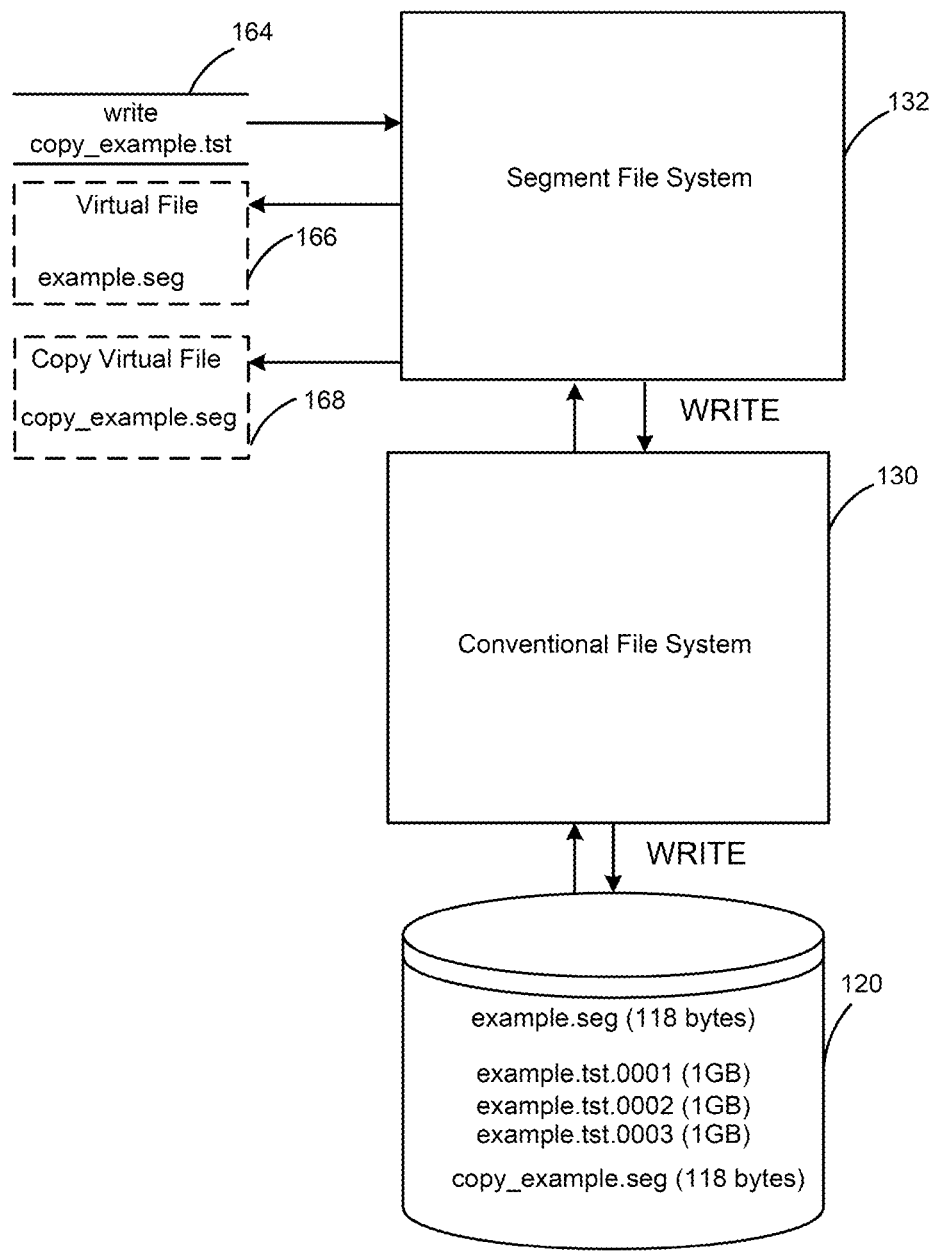

FIG. 5 illustrates a copy operation performed using the same exemplary program file of FIG. 3. When copying a file, only the index file (example.seg) is copied and the segments (example.tst.0001-example.tst.0003) remain in their stored location. For example, a copy request is received for the program file (example.tst) through the file system interface. In response, the conventional file system 130 reads the index file (example.seg) from the data storage medium 120 and delivers the index file (example.seg) to the segment file system 132. The segment file system 132 issues a write request back to the conventional file system 130 of the read index file (example.seg). The conventional file system writes the index file as a copy (copy_example.seg) in a new location of the data storage medium 120. After the copy operation is performed, the segments containing the 3 gigabytes of data (example.tst.001-example.tst.003) are shared by the index file (example.seg) and the copy of the index file (copy_example.seg). A virtual file 168 is produced based on the copy of the index file (copy_example.seg).

Figure 6:
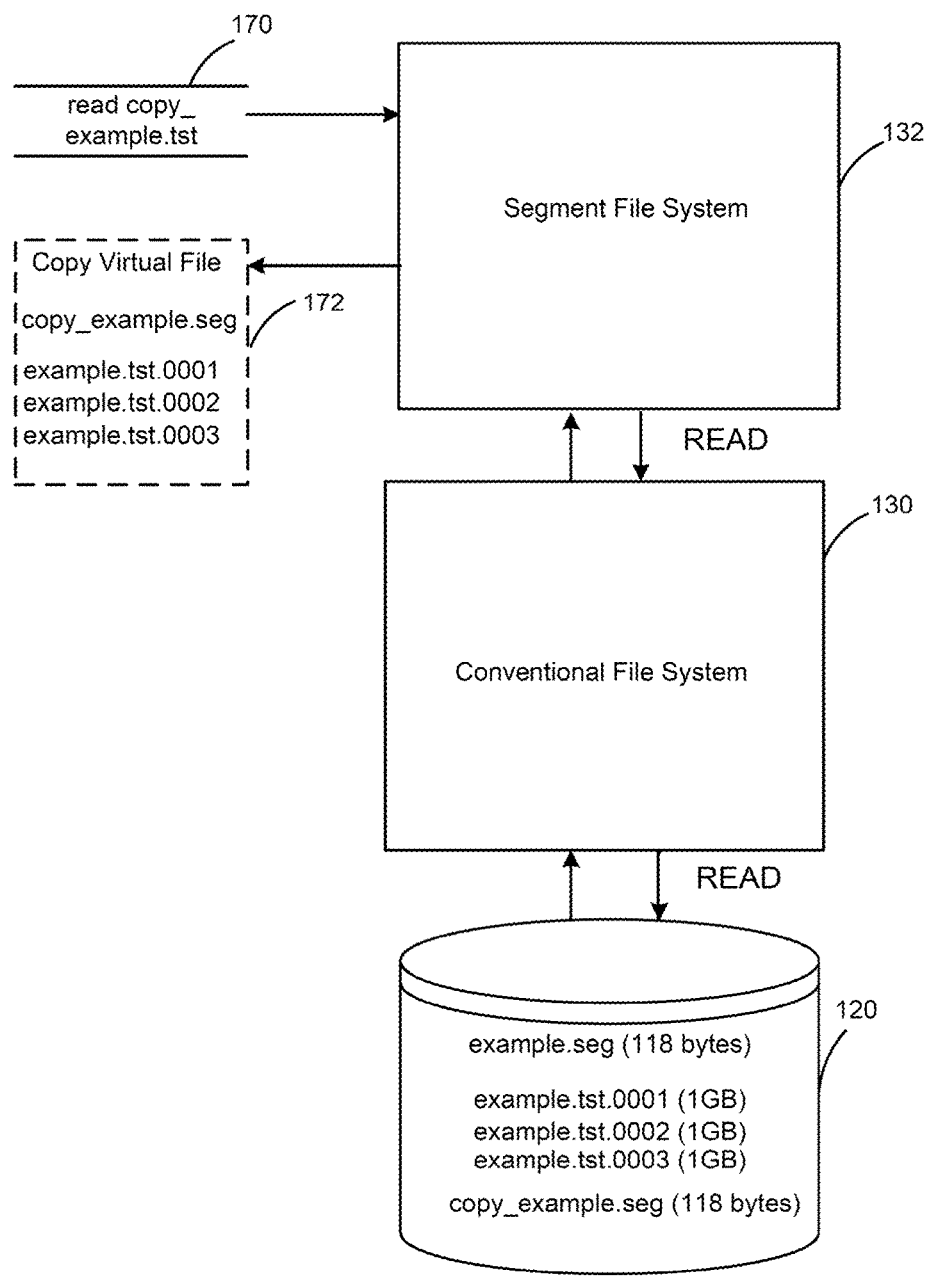

FIG. 6 illustrates a read operation performed of the exemplary copied file of FIG. 5. The segment file system 132 receives a read request 170 of the copied file (copy_example.tst). The segment file system 132 builds a virtual file 172 based on the segment information in the copy of the index file (copy_example.seg). To build the virtual file 172, the copy of the index file (copy_example.seg) includes information that points to the location in the data storage medium 120 where the data is stored. The segment file system 132 uses this information to send read requests to the conventional file system 130 for the data of each segment (example.tst.0001-example.tst.0003). The conventional file system 130 then in turn reads and provides the data of each segment to the segment file system 132 where the virtual file 172 is built and presented to the user as the actual program file.

Figure 7:
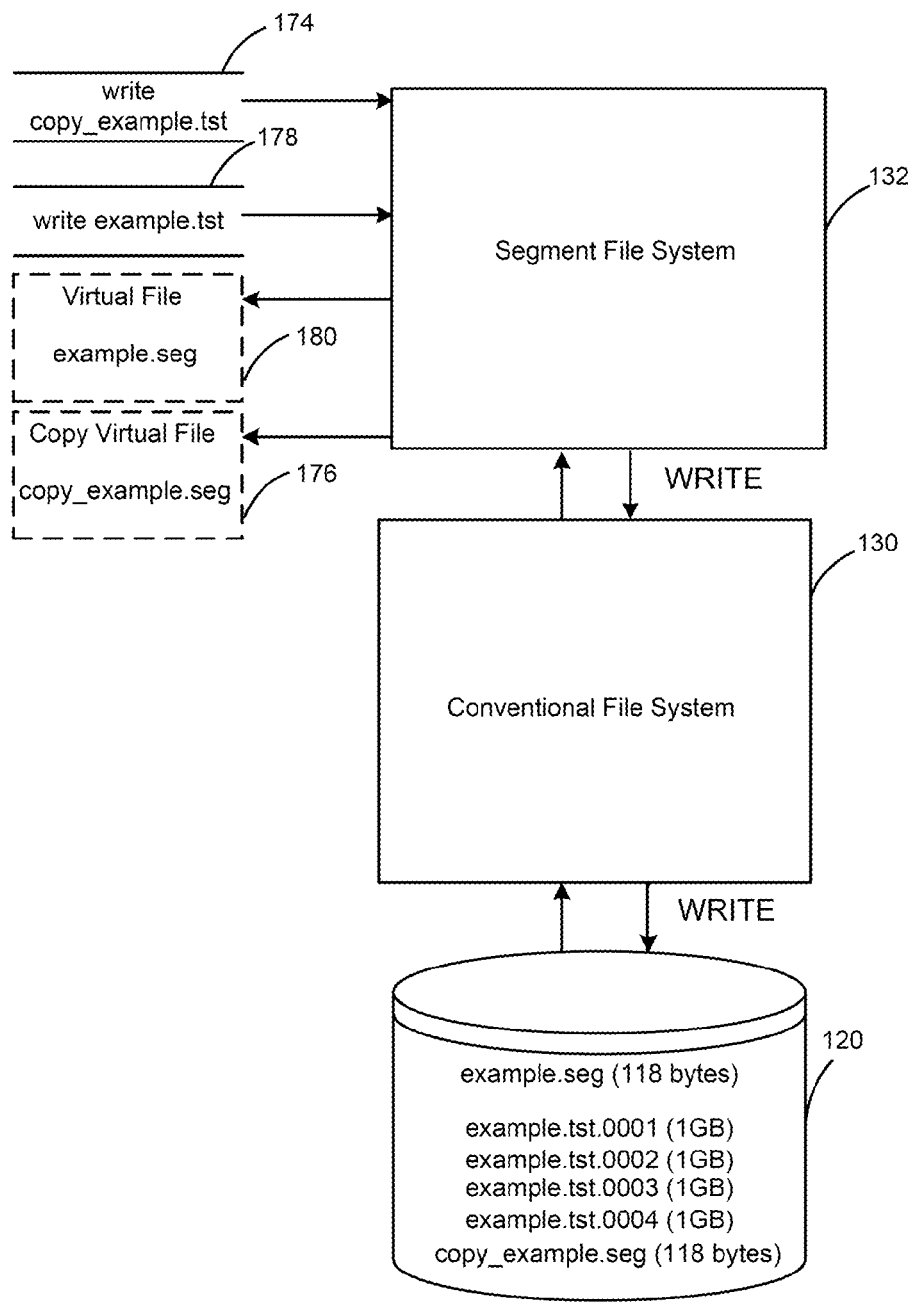

FIG. 7 illustrates a write operation of new data performed on the exemplary program file or the exemplary copied file. When writing new data to a file that is a copy or that has been copied, the original shared data remains unchanged and new data due to the write are appended to the file segments. The segment file system 132 appends the new data by creating a new segment that is stored and by linking the new segment at the end of the segment files in the index file.

For example, a write request 174 of the copied program file (copy_example.tst) is requested through the file system interface. The segment file system 132 partitions the new data from the write request into a new segment (example.tst.0004) and issues a write command to the conventional file system 130 for the new segment. The conventional file system 130 receives the write request and writes the segment (example.tst.0004) as a separate file into the data storage medium 120. The new segment file is linked to the end of the other files, for example, in the copy of the index file (copy_example.seg) in a virtual file 176, but can be stored in the same or different directories as the other segment files (example.tst.0001-example.tst.0003).

Likewise, when a write request 178 of the program file (example.tst) is requested, the segment file system 132 partitions the new data from the write request 178 into a new segment (example.tst.0004) and issues a write command to the conventional file system 130 for the new segment (example.tst.0004). The conventional file system 130 receives the write request and writes the segment (example.tst.0004) as a separate file into the data storage medium 120. The new segment file (example.tst.0004) is linked to the end of the other files (example.tst.0001-example.tst.0003), for example, in the original index file (example.seg) of a virtual file 180, but can be stored in the same or different directories as the other segment files (example.tst.0001-example.tst.0003).

Figure 8:
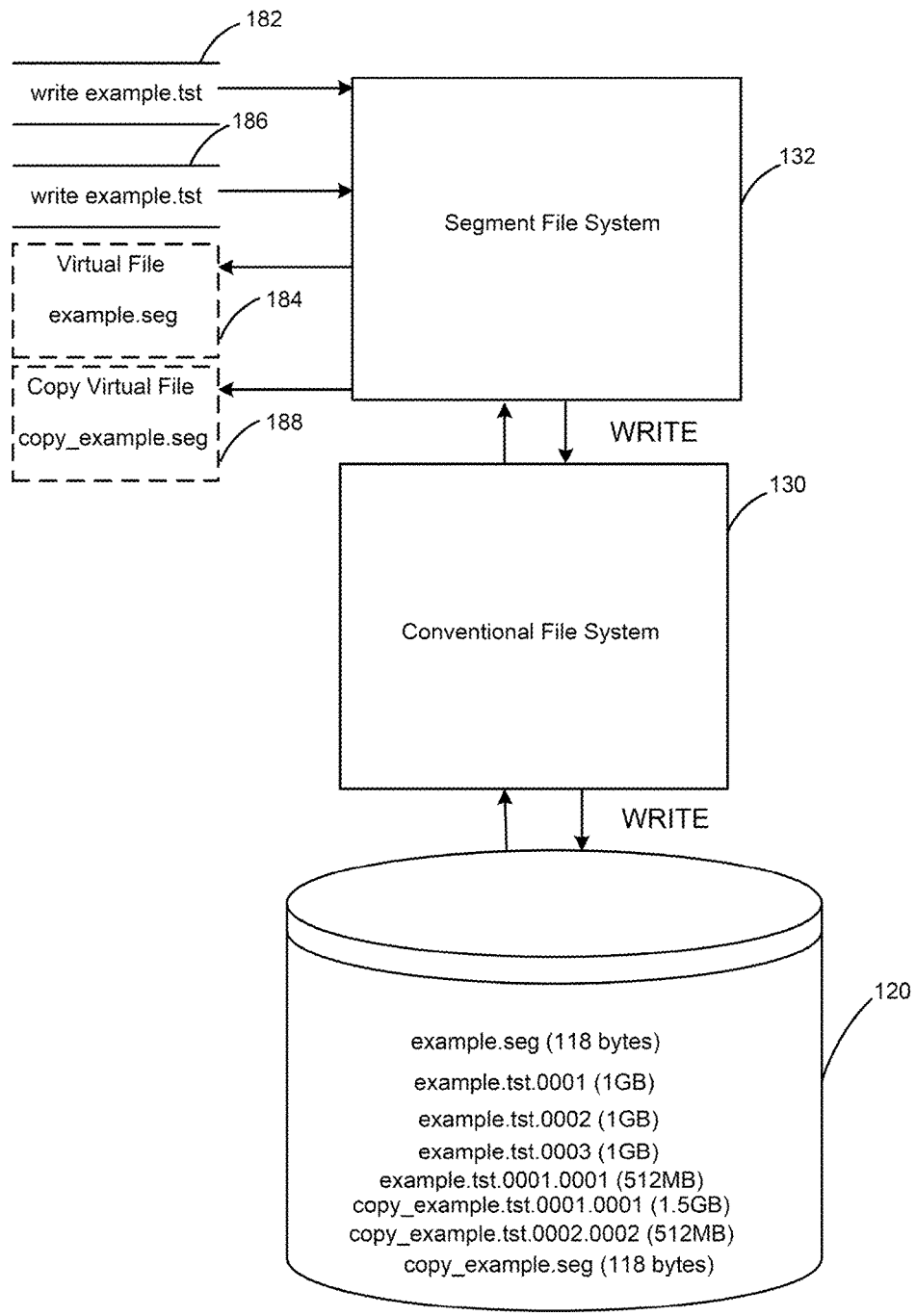

FIG. 8 illustrates a write operation that changes data of the exemplary original file or the exemplary copied file. When writing changes to a file that is a copy or that has been copied, the shared data remains unchanged and the changed data is captured in a new segment that is associated with either the original file or the copied file. The segment file system stores the new segment in the data storage medium and links the new segment in the associated index file in the appropriate location.

For example, a write request that changes the first 512 megabytes of the original program file (example.tst) is requested through the file system interface. The segment file system 132 partitions the changed data from the write request into a new segment (example.tst.0001.0001) and issues a write command to the conventional file system 130 for the new segment (example.tst.0001.0001). The conventional file system 130 receives the write request and writes the segment (example.tst.0001.0001) as a separate file into the data storage medium 120. The new segment file (example.tst.0001.0001) is linked to the segment files (example.tst.0001-example.tst.0003) according to the location of the changed data. For example, in the index file (example.seg) the new segment file is linked to the first 512 megabytes of the files (example.tst) in the virtual file 182 such that the first 512 megabytes of the original segment (example.tst.0001) are ignored.

Likewise, when a subsequent write request 184 is received changes the first 1.5 gigabytes of data of the copied program file (copy_example.tst), the segment files system 132 partitions the changed data from the write request into new segments (copy_example.tst.0001.0001 which is 1 gigabyte, and copy_example.tst.0002.0002 which is 512 megabytes) and issues write requests to the conventional file system 130 for the new segments (copy_example.tst.0001.001, copy_example.tst.0002.0002). The conventional file system 130 receives the write requests and writes the new segments (copy_example.tst.0001.001, copy_example.tst.0002.0002) as separate files into the data storage medium 120. The new segments (copy_example.tst.0001.001, copy_example.tst.0002.0002) are linked to the copied file (copy_example.tst) based on the location of the changed data. For example, in the index file (copy_example.seg) of a virtual file 188, the first new segment file (copy_example.tst.0001.0001) is linked as the first segment file (replacing example.tst.0001) and the new segment file (copy_example.tst.0002.0002) is linked as the first 512 megabytes of the second original segment file (copy_example.tst.0002) such that the first 512 megabytes of the second original segment file (copy_example.tst.0002) are ignored.

Figure 9:
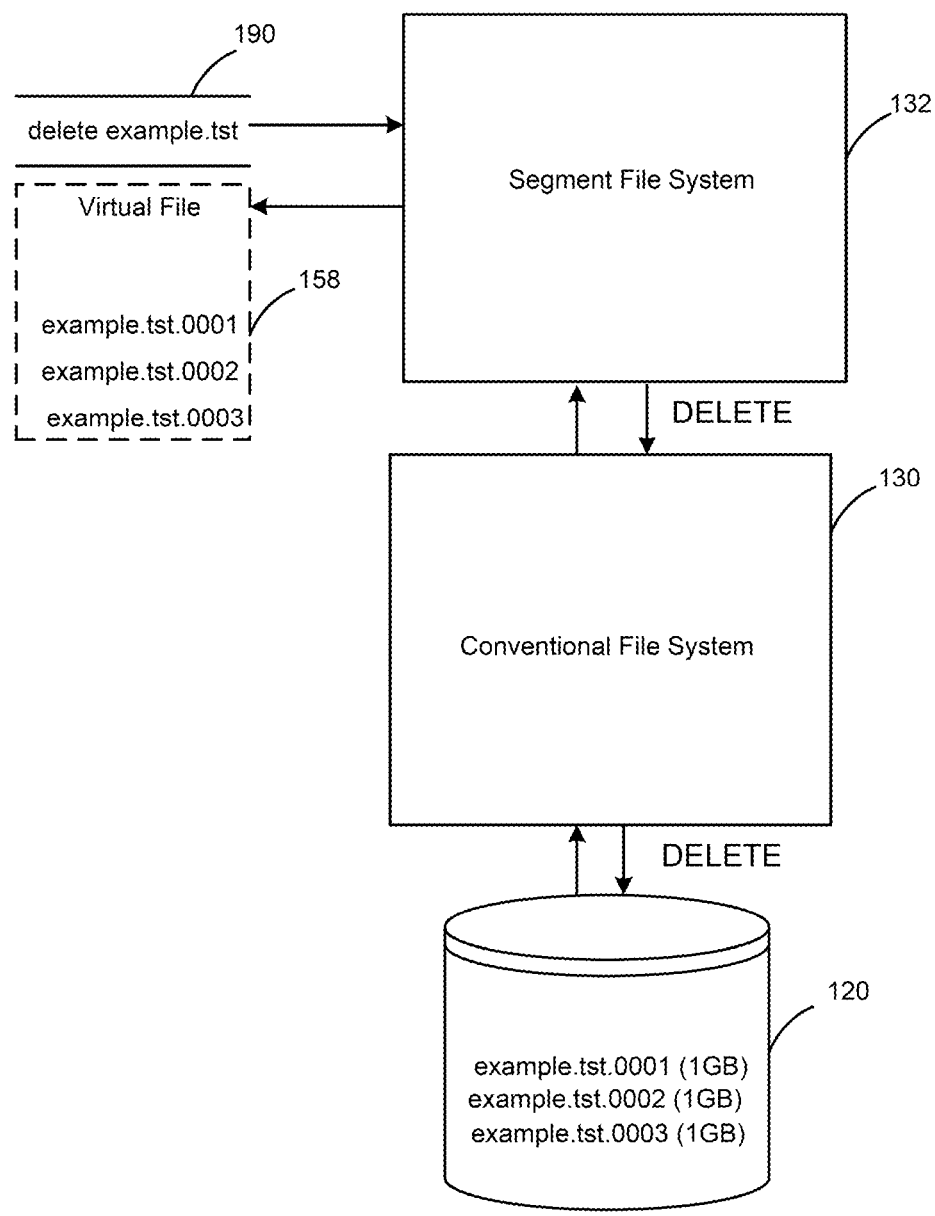

FIG. 9 illustrates a delete operation performed of the exemplary program file of FIG. 3. When a delete request is received for the program file (example.tst), only the index file (example.seg) of the virtual file 158 is deleted and the remaining files left to be deleted by the garbage collector 154 (FIG. 2) of the segment file system 132. For example, a delete request 190 is received through the file system interface. The segment file system 132 receives the delete request 190 and issues a delete request to the conventional file system 130 of the index file (example.tst.seg). The conventional file system 130 receives the delete request and deletes only the index file (example.tst.seg) leaving the segments (example.tst.0001-example.tst.0003) files for the garbage collector 154 (FIG. 2).

Figure 10:
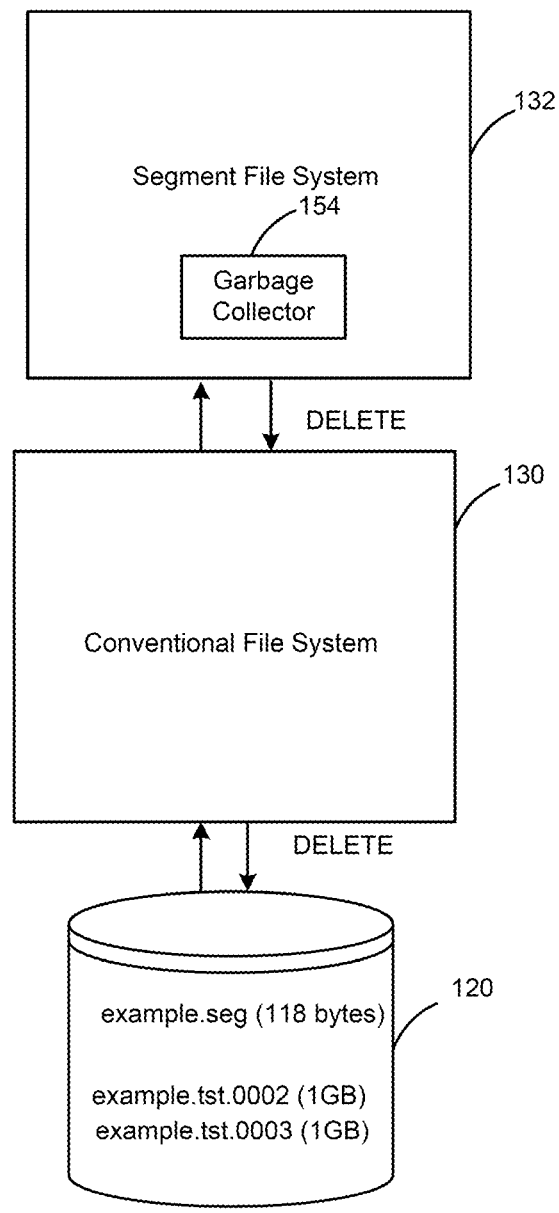
FIG. 10 is a flow diagram illustrating an exemplary garbage collector of the file management system in accordance with exemplary embodiments.

Referring now to FIG. 10, the operations of the garbage collector 154 are shown and described. The garbage collector 154 of the segment file system 130 periodically checks for unused data and deletes the unused data. For example, the garbage collector checks the stored index files (example.seg and copy_example.seg) for any reference to the segment files (example.tst.0001-example.tst.0003). If no reference is made to a particular segment file (e.g., example.tst.0001), the segment file (example.tst.0001) is deleted from the data storage medium 120. The garbage collector 154 issues a delete request to the conventional file system 130 to delete the segment file (example.tst.0001).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing detailed description will provide those skilled in the art with a convenient road map for implementing various embodiments of the disclosure, it should be appreciated that the particular embodiments described above are only examples, and are not intended to limit the scope, applicability, or configuration of the disclosure in any way. To the contrary, various changes may be made in the function and arrangement of elements described without departing from the scope of the disclosure.

What is claimed is:

1. A method executable by a computing device to manage a file, comprising:
    mounting a first file system to a second file system associated with a data storage medium, wherein the first file system is a segment file system;

storing the file by initially creating, by the first file system, a virtual file by partitioning the file into a plurality of segments and by linking each of the plurality of segments in an index file of the first file system;

directing, by the first file system, the second file system to store each of the segments of the virtual file and the index file as separate files on the data storage medium; and in response to a subsequent instruction to copy the file, the second file system providing the index file to the first file system and the first file system responsively providing an updated index file back to the second file system that identifies the same segments as the index file, wherein the second file system stores the updated index file to create a second copy of the file in the second file system without rewriting the separate files representing the segments of the file.

2. The method of claim 1, further comprising configuring a size of the plurality of segments, and wherein the creating the virtual file is based on the size of the plurality of segments.

3. The method of claim 1 further comprising the first file system performing a read request to read the file from a data storage device by reading the files of the second file system corresponding to each of segments from the data storage device.

4. The method of claim 1, further comprising the first file system performing a write request to append data to the file by writing a new segment to the second file system for storage in the data storage device, and the first file system linking the new segment to the other segments of the file in the index file.

5. The method of claim 4, wherein the linking comprises linking the new segment to an end of the plurality of segment files in the index file.

6. The method of claim 1, further comprising the first file system performing a write request to change data of the file by writing a new segment to a data storage device and by linking the new segment to the other segments of the file in the index file.

7. The method of claim 6, wherein the linking the new segment comprises linking the new segment to one or more of the plurality of segment files in a position associated with a location of the changed data.

8. The method of claim 1, further comprising the first file system performing a copy request to make a copy of the file by making a copy of only the index file.

9. The method of claim 1, further comprising the first file system periodically evaluating the index file for a reference to the plurality of segments, and when a reference to one of the plurality of segments does not exist, deleting the one of the plurality of references from a data storage device.

10. A computer system, comprising:
a data storage device that stores files;
a file system that interfaces with the data storage device to manage the files stored on the data storage device; and
a segment file system that interfaces with the file system to perform operations on segmented data files, wherein the segment file system divides the segmented data files into a plurality of separate file segments identified by an index file and directs the first file system to store each of the plurality of separate file segments and the index file as separate files on the data storage device, and wherein the first file system responds to a subsequent instruction to copy the file by providing the index file to the segment file system, and wherein and the segment file system responsively provides an updated index file back to the first file system that identifies the same segments as the index file, wherein the first file system stores the updated index file to create a second copy of the file in the first file system without rewriting the separate files representing the segments of the file.

11. The computer system of claim 10, wherein the segment file system is mounted to the file system.

12. The computer system of claim 11, wherein a size of the plurality of segments is configurable when the segment file system is mounted to the file system.

13. The computer system of claim 10, wherein the file system manages the segmented data file as a virtual file, wherein the virtual file includes the index file and each of the plurality of segments.

14. The computer system of claim 10, wherein the segment file system performs a write operation that interfaces with the file system to write the file to the data storage device by writing the plurality of segments to the data storage device.

15. The computer system of claim 10, wherein the segment file system performs a read operation that interfaces with the file system to read the file from the data storage device by reading the plurality of segments from the data storage device.

16. The computer system of claim 10, wherein the segment file system performs a write operation that interfaces with the file system to append data to the file by writing a new segment to the data storage device and linking the new segment in the index file.

17. The computer system of claim 16, wherein the new segment is linked at an end of the plurality of segment files in the index file.

18. The computer system of claim 10, wherein at least one of the file operations is a write operation that interfaces with the file system to change data of the file by writing a new segment to the data storage device and linking the new segment in the index file.

19. The computer system of claim 18, wherein the new segment is linked to one or more of the plurality of segment files in a position associated with a location of the changed data.

20. The computer system of claim 10, wherein the second file operator is a copy operator that interfaces with the file system to make a copy of the file by making a copy of only the index file in the data storage device.

21. The computer system of claim 10, wherein the segment file system further comprises a garbage collector that periodically evaluates the index file for a reference to the plurality of segments, and when a reference to one of the plurality of segments does not exist, the one of the plurality of references is deleted from a data storage device.

22. A set-top box, comprising:
a data storage device;
a first file system that processes files stored on the data storage device; and
a segment file system that mounts to the first file system to perform file operations on program files stored on the data storage device, wherein the second file system divides the program files into a plurality of separate segments described by an index file and directs the first file system to store each of the plurality of segments and the index file as separate files on the data storage device, and wherein the segment file system performs the file operations on the program files based on index file that includes information about the each plurality of segments of the program file, and wherein the first file system responds to a subsequent instruction to copy a program file by providing the index file of the program file to the segment file system, and wherein and the segment file system responsively provides an updated index file back to the first file system that identifies the same segments of the program file as the index file, wherein the first file system stores the updated index file to create a second copy of the program file in the first file system without rewriting the separate files representing the segments of the program file.

23. The set-top box of claim 22, wherein the segment file system is mounted to the first file system.

24. The set-top box of claim 22, wherein a size of the plurality of segments of the file is configurable when the segment file system is mounted to the first file system.

25. The set-top box of claim 22, wherein the first file system manages the segment file system as a virtual file, wherein the virtual file includes the index file and the plurality of segments.

* * * * *